United States Patent [19]

Gray, Jr.

[11] Patent Number: 5,489,126
[45] Date of Patent: Feb. 6, 1996

[54] LABELED PIPE FITTING AND METHOD

[76] Inventor: Lawrence C. Gray, Jr., 1500 San Pasqual St., Pasadena, Calif. 91106

[21] Appl. No.: 347,791

[22] Filed: Nov. 28, 1994

Related U.S. Application Data

[63] Continuation of Ser. No. 957,501, Oct. 1, 1992, Pat. No. 5,390,964.

[51] Int. Cl.⁶ .................................................. F16L 35/00
[52] U.S. Cl. ...................... 285/93; 285/381 C; 285/909; 40/306; 138/104; 206/459.5; 206/497
[58] Field of Search .......................... 285/93, 381, 423, 285/909; 166/113; 248/542; 138/104; 24/306, 442; 40/306–317, 626; 206/459.5, 497

[56] References Cited

U.S. PATENT DOCUMENTS

| | | | |
|---|---|---|---|
| 1,685,392 | 9/1928 | Beadle | 206/497 X |
| 2,876,112 | 3/1959 | Vail | 206/497 X |
| 4,205,750 | 6/1980 | Dews | 206/497 |
| 4,425,390 | 1/1984 | Changani | 285/381 X |
| 4,813,717 | 3/1989 | Watts | 285/397 X |
| 4,827,643 | 5/1989 | Hearst | 40/306 |
| 4,946,034 | 8/1990 | Matsuhara | 206/459.5 X |
| 5,138,139 | 8/1992 | Mitsutoshi | 235/464 X |
| 5,182,954 | 2/1993 | Menheere | 138/104 X |
| 5,390,964 | 2/1995 | Gray | 285/93 |

FOREIGN PATENT DOCUMENTS 322312   6/1989   European Pat. Off. ............... 206/497

*Primary Examiner*—Dave W. Arola
*Attorney, Agent, or Firm*—Jeffrey G. Sheldon; Sheldon & Mak, Inc.

[57] ABSTRACT

A labeled pipe fitting and a method for applying labels to the outer surface of a pipe fitting which is covered with a layer of oil that resists labelling with an adhesive backed label is provided. The label, which is imprinted with indicia relating to the pipe fitting, is secured onto the pipe fitting with a substantially transparent plastic tube which is shrunk with heat around the pipe fitting and the label.

17 Claims, 1 Drawing Sheet

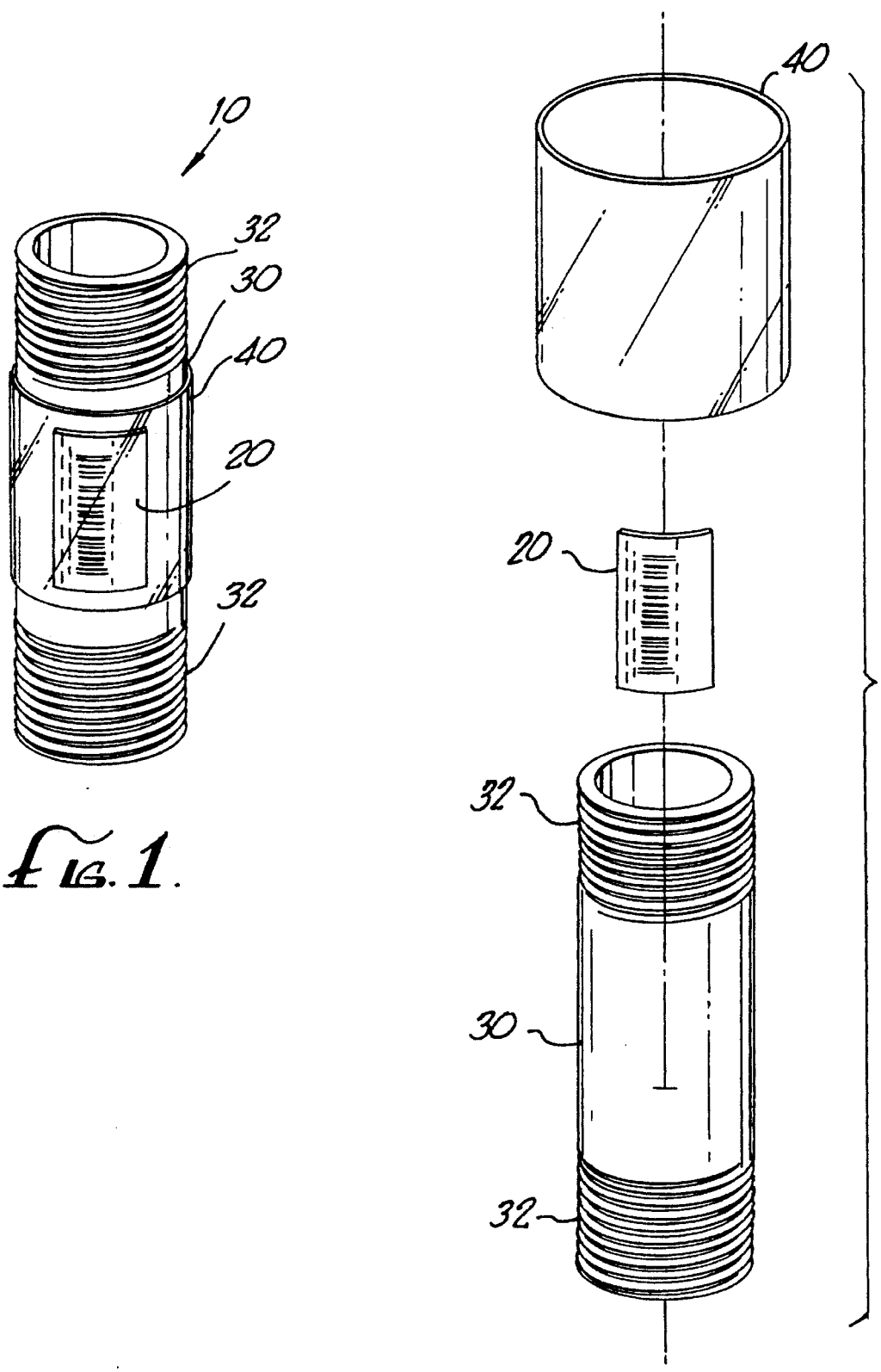

LABELED PIPE FITTING AND METHOD

This is a continuation of the application Ser. No. 07/957,501, filed Oct. 1, 1992, now U.S. Pat. No. 5,390,964.

BACKGROUND

The present invention is directed to a labeled pipe fitting and a method for applying a label to the outer surface of a pipe fitting which resists labelling with an adhesive backed label.

Pipe fittings, and more specifically, pipe nipples are commonly sold with an outer surface which is coated with a layer of protectant such as oil which is used to machine the pipe nipple and protect the pipe nipple from corrosion. This protectant is typically very slick and inhibits the use of an adhesive label which provides information about the pipe nipple, such as, size, price and possibly a bar code. The information on the label is important to the customer to make an informed purchase. Additionally, the bar code is particularly important to the store which wants to sell the product using a bar code reader. Therefore, it is desirable to have a label detailing this information securely attached to the pipe nipple.

One way to solve this problem involves completely covering the pipe nipple with a plastic material and adhering an adhesive backed label to the plastic. However this method is not entirely satisfactory. Since the plastic covers the entire nipple, the threads of the nipple cannot be tested without removing the plastic and before purchase to determine if the correct size pipe nipple is being purchased, or if the threads of the pipe nipple have been damaged. Moreover, since the plastic must be removed before installation of the pipe nipple, the specifications of the pipe nipple will be lost. Moreover, the plastic and the label create a substantial waste requiring disposal. Additionally, in many cases, since the pipe fittings are stored in large bins in the store, the adhesive backed labels fall off and the information on the label is lost.

Accordingly, there is a need for a labeled pipe fitting and a method for applying a label to a pipe fitting whose outer surface is covered with a protectant which will allow the pipe fitting to be tested and installed without removing the label, thereby reducing the uncertainty involved in purchasing a pipe fitting, reducing the amount environmental waste, and reducing the amount of plastic used to label the pipe fitting.

SUMMARY

The present invention is directed to a labeled pipe fitting and a method for applying a label to a pipe fitting that satisfies this need, the labeled pipe fitting and method being useful for attaching a label to the outer surface of a pipe fitting.

A labeled pipe fitting having features of the present invention comprises a pipe fitting, a label having indicia relating to the pipe fitting, and a heat reduced, substantially transparent tube of plastic shrunk around the nipple and the label. The pipe fitting has an outer surface and can have connecting means on opposing ends of the pipe fitting for connecting the pipe fitting in fluid communication to another pipe fitting. The label is secured against the outer surface of the pipe fitting by the tube of plastic. Preferably, the tube of plastic is sufficiently short to leave at least one connection means of the pipe fitting exposed while being sufficiently long to cover the entire label with the tube of plastic.

The tube of plastic is shrunk around the pipe fitting and the label and holds the label on the pipe fitting while preferably exposing at least one of the connection means for testing and installing the pipe fitting. Accordingly, the pipe fitting can be tested before purchase without removing the plastic to determine if the correct size pipe fitting is being purchased or if the connection means of the pipe fitting have been damaged. Moreover, if the pipe fitting is sufficiently long that the tube of plastic does not cover either connection means, the pipe fitting can be completely installed while retaining the benefits of having the label on the pipe fitting, such as, maintaining the information about the pipe fitting and reducing the amount of environmental waste.

The outer surface of the pipe fitting nipple can be very smooth or covered with a layer of protectant, such as oil, which resists labelling with an adhesive backed label. The connection means can be pipe threads which are machined into the outer surface of the pipe on opposing ends of the pipe.

In one embodiment, the indicia on the label comprises a bar code. The tube of plastic is sufficiently transparent that the bar code can be read with a bar code reader. The label can be heat sensitive with the indicia on the label being printed by heat. The tube of plastic can be made of polyvinyl chloride. The wall thickness of the tube of plastic typically is about 0.002 inches.

Typically, the labeled pipe fitting is a pipe nipple having an outer surface which is covered with a protectant that resists labelling with an adhesive backed label and the tube of plastic is sufficiently short to leave at least the threads of at least one end of the nipple exposed for testing and installing without removing the tube and the tube is sufficiently long to cover the entire label.

The invention also includes a method for labelling a pipe fitting having an outer surface that resists labelling with an adhesive backed label, the method comprising imprinting a label with indicia relating to the pipe fitting and heating a tube of plastic shrink wrap around the pipe fitting and the label.

The present invention provides a labeled pipe fitting and a method for labelling the outer surface of a pipe fitting which resists labelling with an adhesive backed label and allows the connection means of the pipe fitting to be tested for size and quality and installed, without removing the label, thereby reducing the uncertainty in purchasing the pipe fitting and reducing the amount of environmental waste. Moreover, the label is securely held by the tube of plastic and will not fall off the pipe fitting in the store bin.

DRAWINGS

These and other features, aspects and advantages of the present invention will become better understood with reference to the following description, appended claims and accompanying drawings where:

FIG. 1 is a perspective view of a labeled pipe fitting embodying features of the present invention; and FIG. 2 is an exploded perspective view of the pipe fitting, label and tube of plastic of FIG. 1.

DESCRIPTION

With reference to the figures, the present invention is directed to a labeled pipe fitting 10 and a method for applying a label 20 to the outer surface of a pipe fitting 30.

The following discussion describes in detail one embodiment of the invention and several variations on that embodiment. This discussion should not be construed as limiting the invention to that particular embodiment or to those particular variations. Practitioners skilled in the art will recognize numerous other embodiments and variations as well. For a definition of a complete scope of the invention, the reader is directed to the appended claims.

The term "pipe fitting" as used herein generally means any fitting used in fluid, gas or solid transport systems, including lengths of pipe, pipe nipples, connectors, T's, elbows, end caps and sprinkler risers.

The labeled pipe fitting 10 and method for applying a label 20 to the outer surface of a pipe fitting 30 comprises:

(a) the pipe fitting 30;

(b) the label 20; and (c) a tube of plastic 40.

The pipe fitting 30 shown in the figures is a pipe nipple comprising a hollow conduit having connections means 32 on opposing ends for connecting the pipe fitting 30 in fluid communication to another pipe fitting. The pipe fitting 30 can be made of any material which is not adversely affected by the heat required to shrink the tube of plastic 40. In most cases, the pipe fitting 30 is made of galvanized or ungalvanized steel. Alternatively, the pipe fitting 30 can be made of aluminum, stainless steel, plastic, brass or copper. The length or shape of the pipe fitting 30 can vary according to the length or shape required for the specific application. In the embodiment shown in the drawings, since the length of the pipe 30 is relatively short, the pipe fitting 30 is considered a pipe nipple.

Often the outer surface of the pipe fitting 30 is very smooth or is covered with a protectant, such as oil, that resists or inhibits labelling with an adhesive backed label. The protectant can be used to protect the pipe fitting 30 from corrosion or it can be used to assist in the cutting or machining of the pipe fitting 30.

The connection means 32 can be anything capable of connecting the pipe fitting 30 in fluid communication to another pipe fitting. In the embodiment shown in the figures, the connection means 32 is male pipe threads which are machined into the outer surface on opposing ends of the pipe fitting 30. Alternatively, the connection means 32 could be female pipe threads machined on the inner surface of the pipe fitting 30 or a press fit connection or slip fit connection.

The label 20 can be any size capable of containing the desired indicia, such as the length, size and bar code relating to the pipe fitting 30. In the embodiment shown in the drawings the label 20 is approximately 1"×¾". The label 20 can be made of a heat sensitive plastic and the indicia is put on the label 20 with heat. The heat sensitive plastic is preferred since the bar code can be easily imprinted on the label 20. The type of label 20 is chosen so it is not damaged while shrinking the tube of plastic 40 with heat or during operation of the labeled pipe fitting 10 in extreme temperatures.

The tube of plastic 40 can be any plastic, such as polyvinyl chloride, which shrinks upon application of heat. Polyvinyl chloride is preferred since the plastic can withstand continuous operations from −20° C. to +100° C. and is fungus resistant and is self-extinguishing. The tube of plastic 40 can be any color which is substantially transparent and allows the label 20 to be read.

The thickness of the tube of plastic 40 can vary according to the particular application and the type of plastic being used. However, to reduce costs and environmental waste, the thickness of the tube of plastic 40 should be maintained at the minimum thickness level that allows the label 20 to be securely held on the pipe fitting 30. In the embodiment shown in the drawings, the thickness of the tube of plastic 40 is about 0.002 inches.

The tube of plastic 40 is sufficiently long so the entire label 20 is covered by the tube of plastic 40 and preferably is sufficiently short to leave at least the connection means 32 of at least one end of the pipe fitting 30 exposed for testing and installing the pipe fitting 30 without removing the tube 40. Preferably, the tube of plastic 40 is slightly longer than the label 20 to allow for inaccuracies in centering. As shown in the drawings, the tube of plastic 40 is approximately 1⅜" long.

Preferably, the tube of plastic 40 is sufficiently short that both ends of the pipe fitting 30 are exposed so that both connection means 32 are available for testing. If both connection means 32 are exposed, the pipe fitting 30 can be installed and used without removing the tube of plastic 40 or the label 20 and, thus, avoiding trash and allowing the pipe fitting 40 to be permanently labeled.

The heating required to shrink the tube of plastic 40 can vary according to the type of plastic, the thickness of the tube of plastic 40, the amount of time that the heat is applied to the tube of plastic 40, and the temperature of the heat. The temperature of the heat must be sufficient to shrink the tube of plastic 40 and yet not damage the pipe fitting 30, the tube of plastic 40 or the label 20. Accordingly, a high temperature for a short period of time or a low temperature for an extended period of time can be sufficient.

Typically a temperature of between 300° F. and 550° F. for approximately five to twenty seconds, applied to the tube of plastic 40 made of polyvinyl chloride can be sufficient to shrink the tube of plastic 40 around the pipe fitting 30. A suitable machine for shrinking the tube of plastic 40 is the Model ST188, 35 AMP machine made by BELCO Incorporated in Pasadena, Calif.

The pipe fitting 30 is manufactured with connection means 32, such as pipe fitting threads on opposing ends. A label 20 containing indicia regarding the pipe fitting 30 is applied to the outer surface of the pipe fitting 30. A tube of plastic 40 is then slipped over the pipe fitting 30 and the label 20 in such a way that the tube of plastic 40 completely covers the label 20 while exposing the threads of at least one end of the pipe fitting 20 for testing and installing without removing the tube of plastic 40. Heat is then applied and maintained on the tube of plastic 40 until the tube of plastic 40 shrinks securely around the label 20 and the pipe fitting 30.

The labeled pipe fitting 10 and a method for applying a label 20 to the outer surface of a pipe fitting 30 has many advantages which include allowing the pipe fitting 30 to be tested for size and quality of the threads before purchase of the pipe fitting 30 thereby reducing the uncertainty in purchasing the pipe fitting 30. Additionally, the pipe fitting 30 can be installed without removing the label 20 thereby reducing the amount of environmental waste and maintaining pertinent information on the pipe fitting 30. Also, the label 20 is securely held on the pipe fitting 30 by the tube of plastic 20 and will not fall off in the store bin.

Although the present invention has been described in considerable detail with reference to certain preferred versions, many other versions should be apparent to those skilled in the art. Therefore, the spirit and scope of the appended claims should not necessarily be limited to the description of the preferred versions contained herein.

What is claimed is:

1. An individually labeled piped fitting comprising:
   (a) an individual pipe fitting having an outer surface and connection means on one end of the pipe fitting for connecting to another pipe fitting;
   (b) on the outer surface of the pipe fitting, a label having indicia relating to the pipe fitting thereon; and
   (c) a heat reduced, substantially transparent, tube of plastic shrunk around the outer surface of the pipe fitting and the label, the tube of plastic being sufficiently short to leave at least a portion of the connection means exposed for testing the pipe fitting without removing the tube;
   wherein the pipe fitting is individually packaged.

2. The labeled pipe fitting of claim 1 wherein the tube is sufficiently long so that substantially the entire label is covered by the tube.

3. The labeled pipe fitting of claim 1 wherein the connection means includes an externally threaded surface on the outer surface of the pipe fitting.

4. The labeled pipe fitting of claim 1 wherein the pipe fitting comprises connection means on opposing ends of the pipe fitting and the tube of plastic is sufficiently short to leave at least a portion of the connection means on each end of the pipe fitting exposed for testing the pipe fitting without removing the tube.

5. The labeled pipe fitting of claim 4 wherein the tube is sufficiently long so that substantially the entire label is covered by the tube.

6. The labeled pipe fitting of claim 4 wherein the tube of plastic is sufficiently short to leave the connection means on each end of the pipe fitting exposed for testing and installing the pipe fitting without removing the tube.

7. The labeled pipe fitting of claim 1 wherein the outer surface of the pipe fitting is covered with a layer of protectant that resists labelling with an adhesive-backed label.

8. The labeled pipe fitting of claim 1 wherein the indicia comprises a bar code, and wherein the tube is sufficiently transparent that the bar code can be read with a bar code reader.

9. An individually labeled pipe fitting comprising:
   (a) an individual pipe fitting having an outer surface and an externally threaded surface on opposing ends of the outer surface of the pipe fitting;
   (b) on the outer surface of the pipe fitting, a label having indicia relating to the pipe fitting thereon; and
   (c) a heat reduced, substantially transparent, tube of plastic shrunk around the outer surface of the fitting and the label, the tube being sufficiently short to leave at least a portion of the threads, of at least one end of the fitting, exposed for testing without removing the tube;
   wherein the pipe fitting is individually packaged.

10. The labeled pipe fitting of claim 9 wherein the tube is sufficiently long so that substantially the entire label is covered by the tube.

11. The labeled pipe fitting of claim 9 wherein the tube of plastic is sufficiently short to leave the threads at each end of the pipe fitting partly exposed for testing without removing the tube.

12. The labeled pipe fitting of claim 9 wherein the tube of plastic is sufficiently short to leave the threads at each end of the pipe fitting sufficiently exposed so that the fitting can be installed without removing the tube.

13. A method for labelling an individual pipe fitting having an outer surface and connection means on at least one end of the pipe fitting, the method comprising the steps of:
   (a) imprinting a label with indicia relating to an individual pipe fitting;
   (b) applying the label to an outer surface of the pipe fitting having connection means on at least one end of the pipe fitting; and
   (c) heating a tube of plastic shrink wrap which is substantially transparent, around the outer surface of the individual pipe fitting and the label, the tube of plastic being sufficiently short to leave the connection means on at least one end of the fitting partly exposed for testing the fitting without removing the tube;
   wherein the pipe fitting is individually labeled.

14. The method of claim 13 wherein the tube is sufficiently long that substantially the entire label is covered by the tube.

15. The method of claim 13 wherein the outer surface of the pipe nipple is covered with a layer of protectant that resists labelling with an adhesive-backed label.

16. The method of claim 13 wherein the pipe fitting has connection means on opposed ends of the pipe fitting and the tube of plastic is sufficiently short to leave the connection means on both ends of the pipe fitting partly exposed for testing with the label maintained on the pipe fitting.

17. The method of claim 13 wherein the pipe fitting has connection means on opposed ends of the pipe fitting and the tube of plastic is sufficiently short to leave the connection means on both ends of the pipe fitting sufficiently exposed for installing with the label maintained on the pipe fitting.

* * * * *